Feb. 10, 1953  A. NOVICK  2,627,792
ENVELOPE PATCH APPLYING MECHANISM
Filed Aug. 30, 1950  13 Sheets-Sheet 2
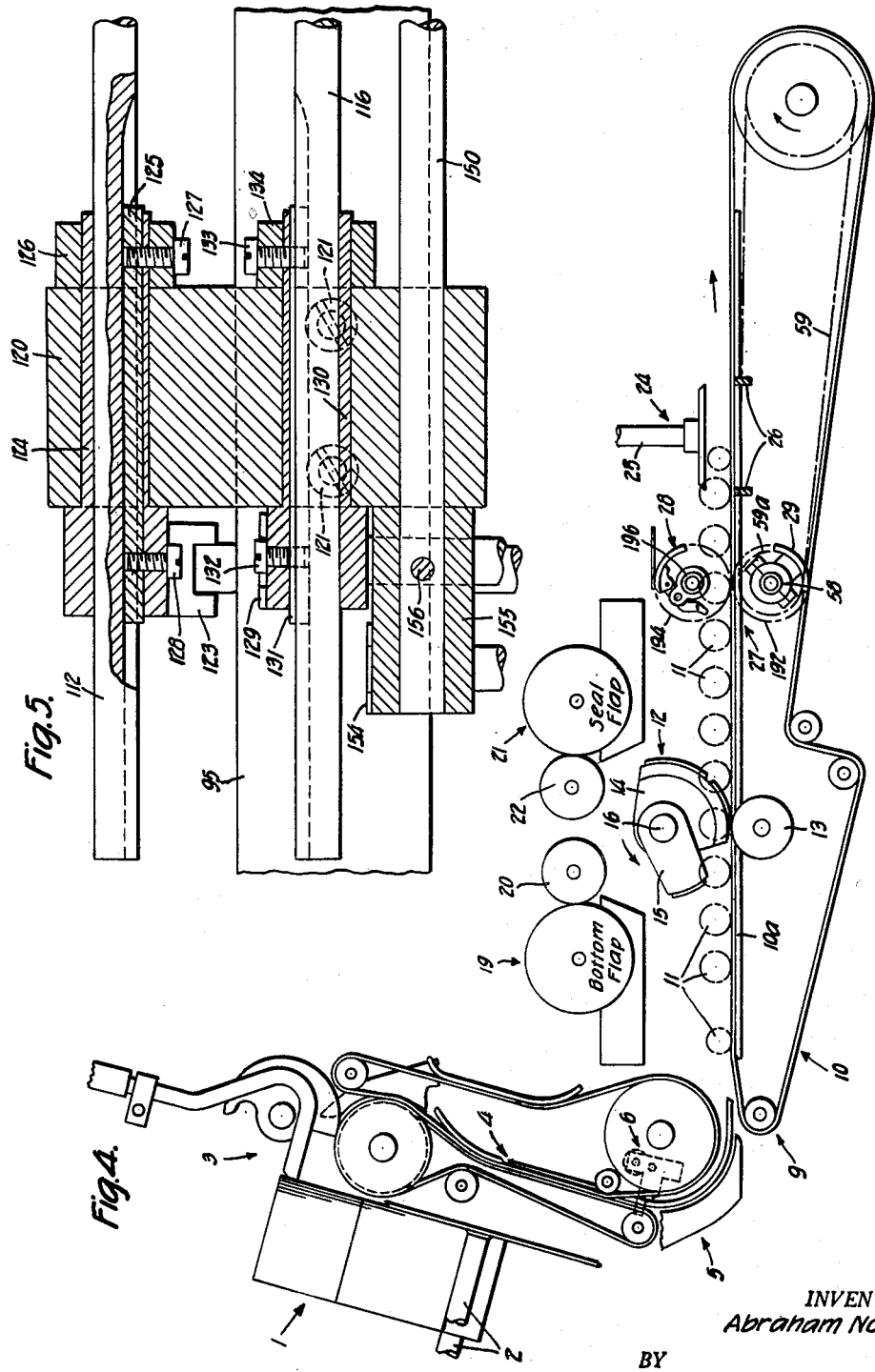
INVENTOR.
Abraham Novick
BY
Moses, Nolte, Crews & Berry
ATTORNEYS

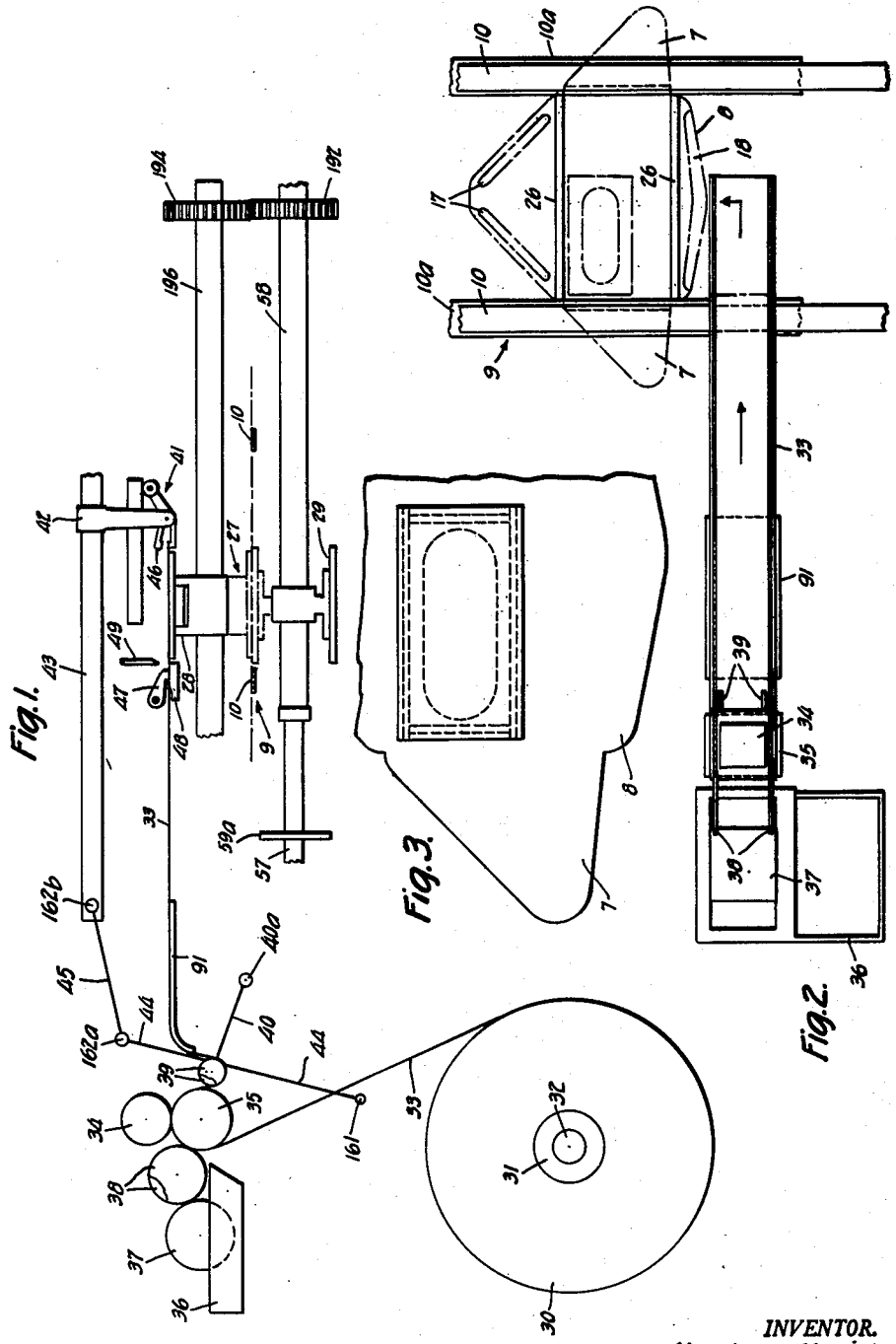

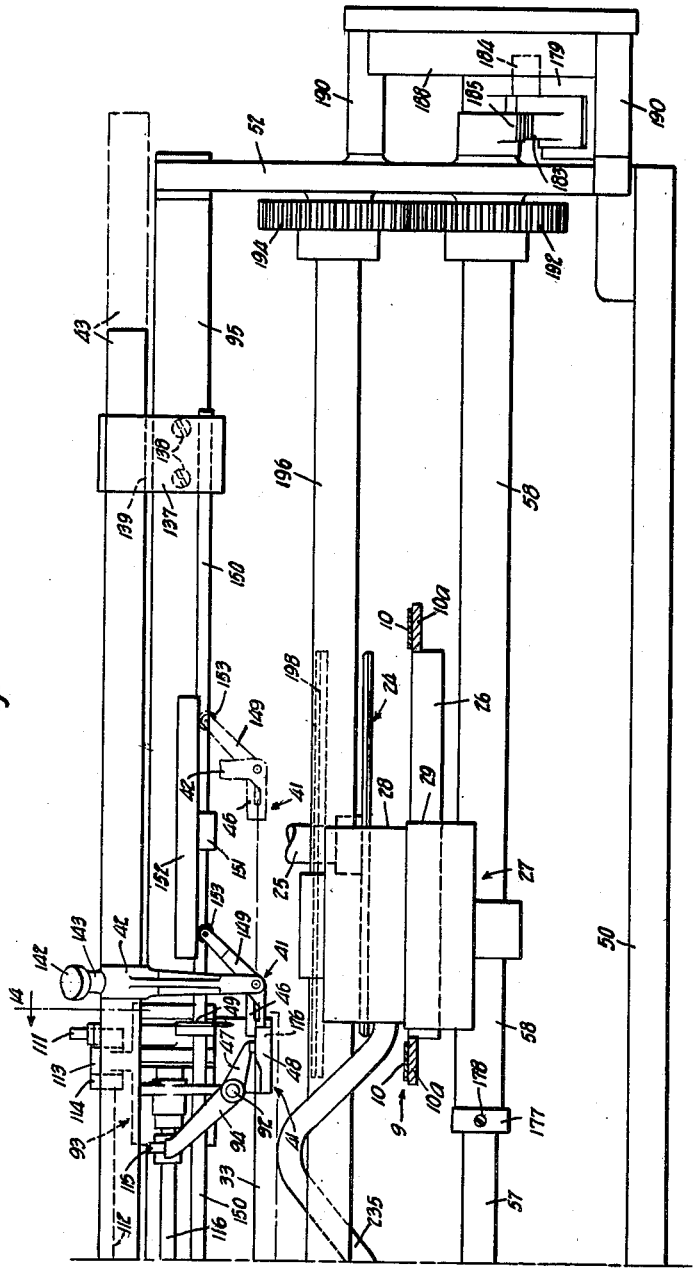

Feb. 10, 1953     A. NOVICK     2,627,792
ENVELOPE PATCH APPLYING MECHANISM
Filed Aug. 30, 1950     13 Sheets-Sheet 5
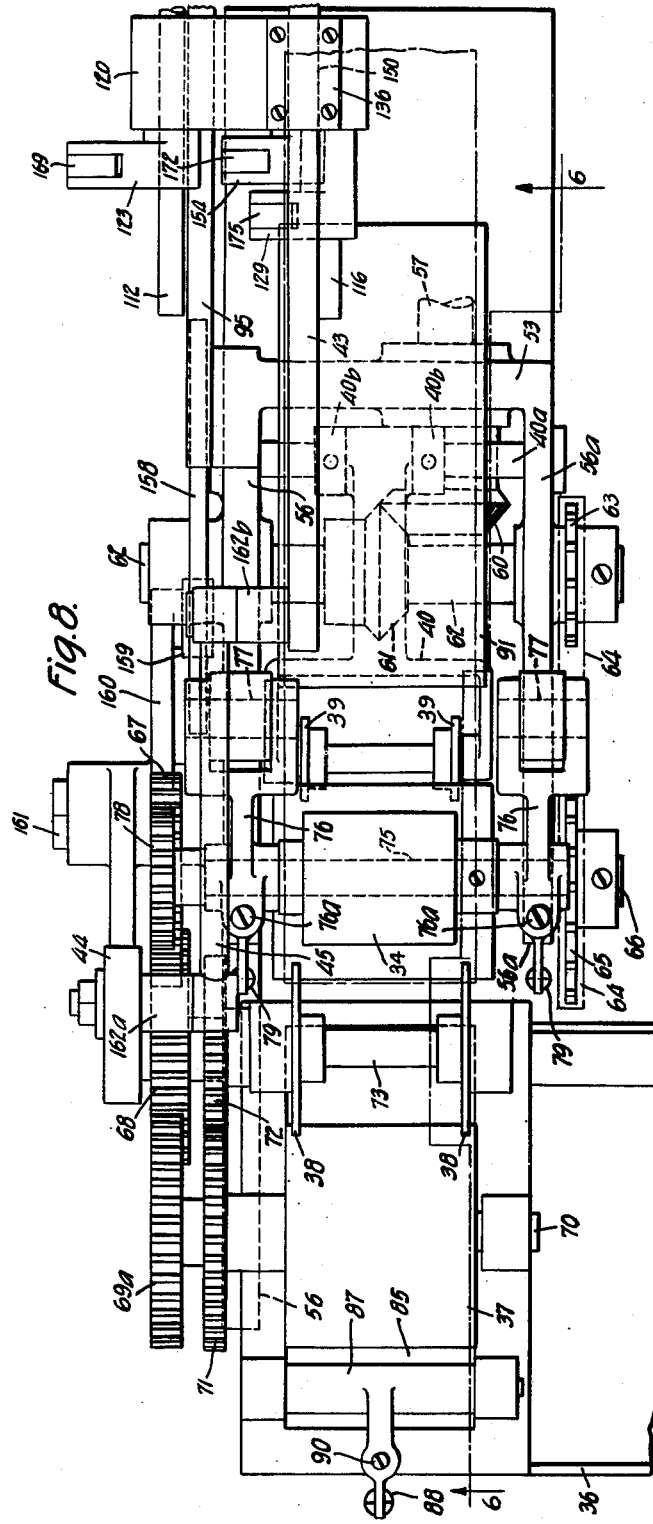
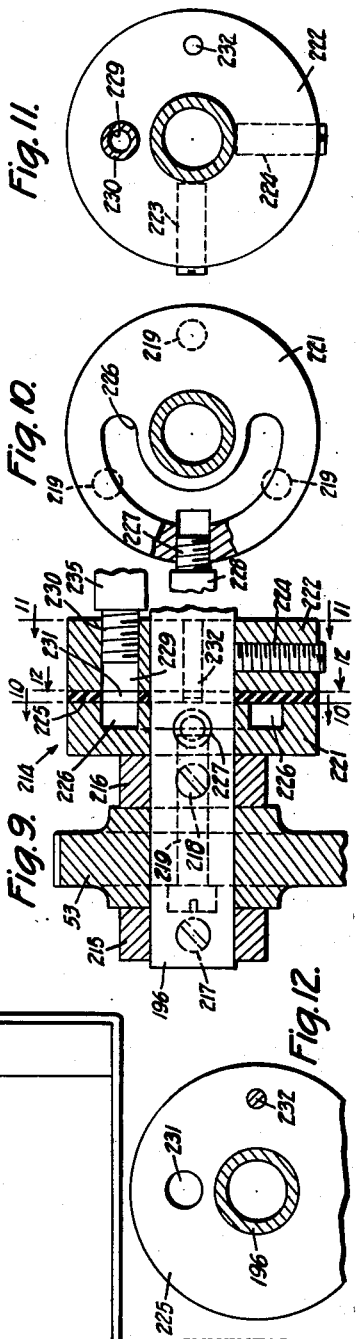
INVENTOR.
Abraham Novick
BY
Moses, Nolte, Crews & Berry
ATTORNEYS Feb. 10, 1953  A. NOVICK  2,627,792
ENVELOPE PATCH APPLYING MECHANISM
Filed Aug. 30, 1950  13 Sheets-Sheet 7
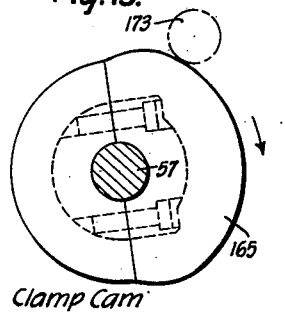
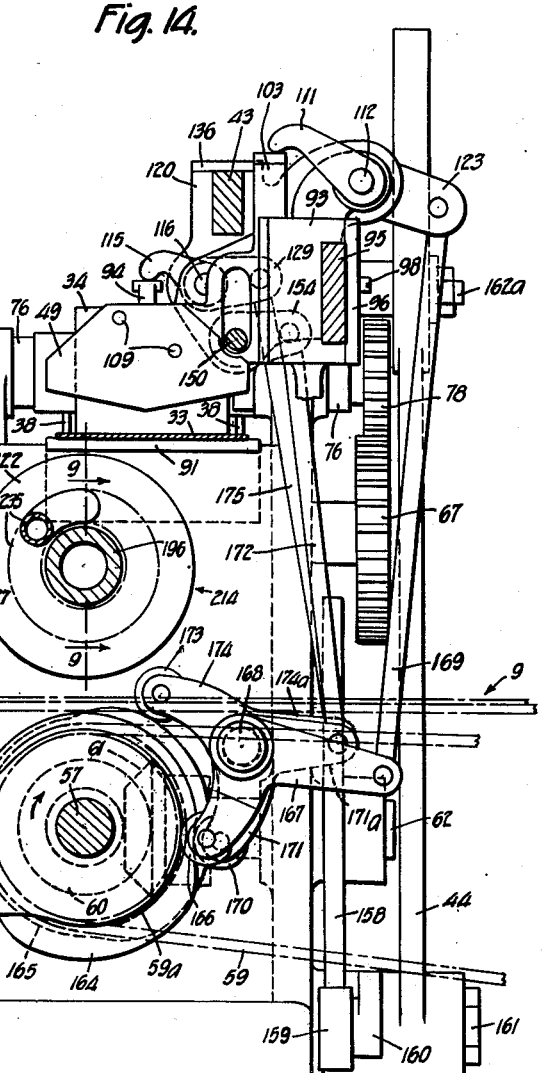
INVENTOR.
Abraham Novick
BY
Moses, Nolte, Crews & Berry
ATTORNEYS

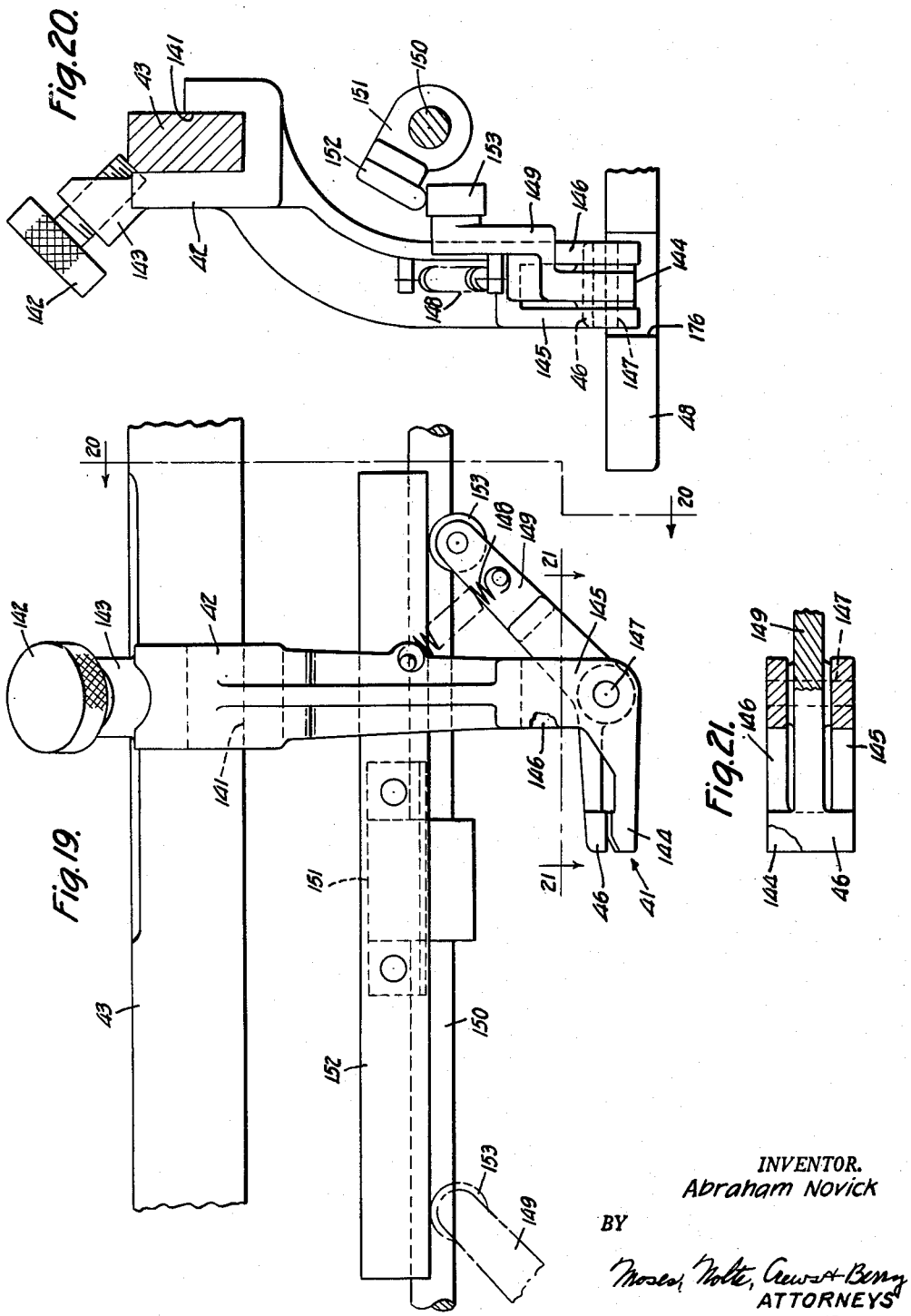

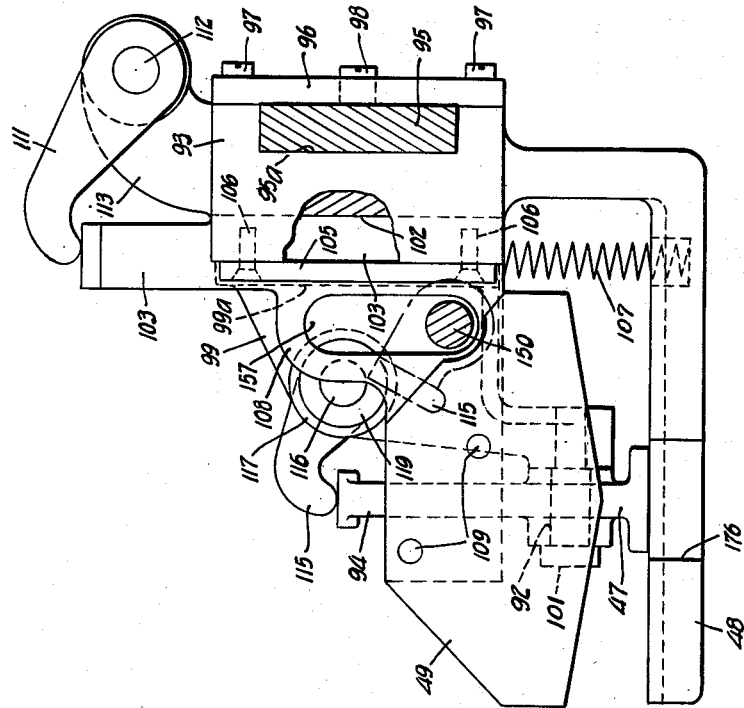

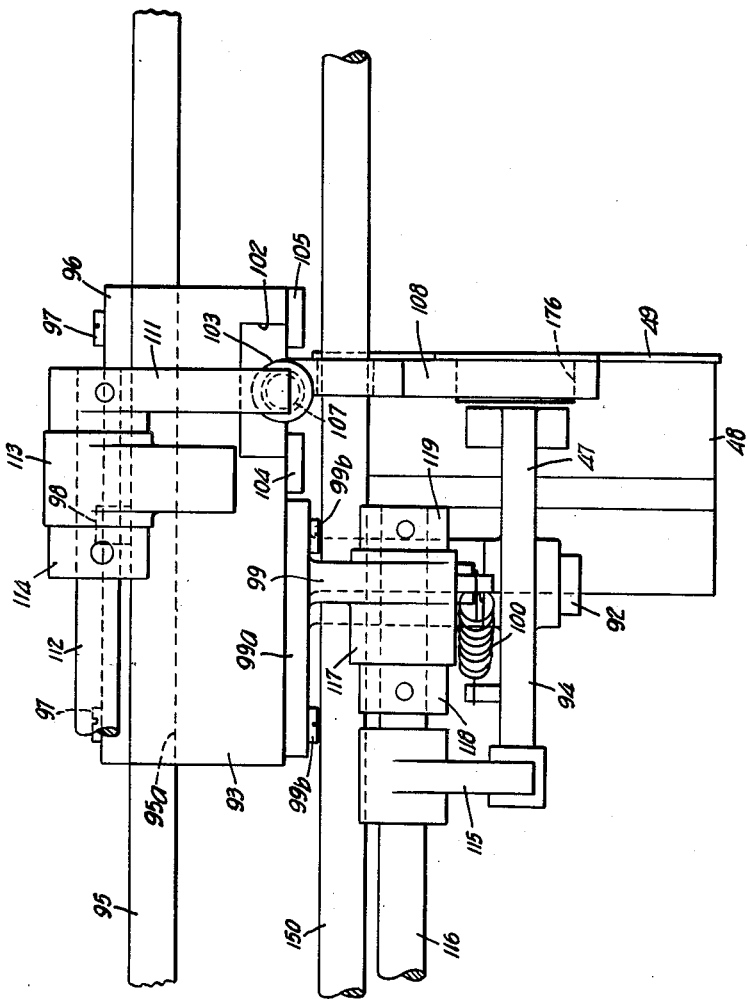

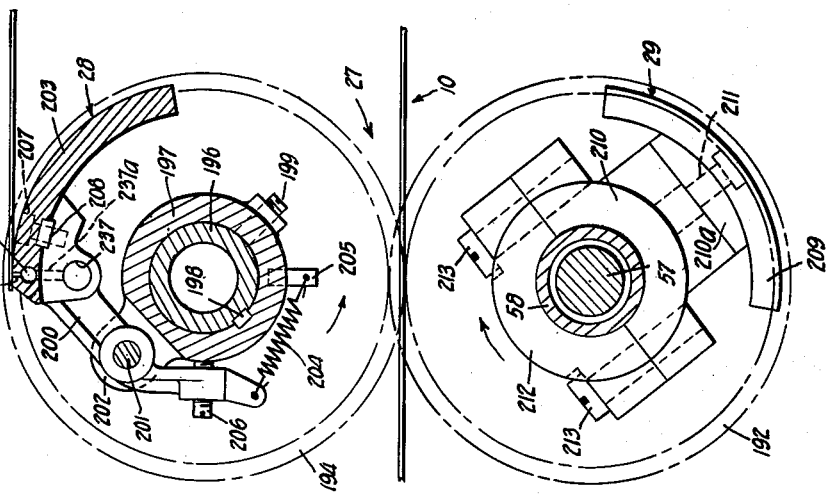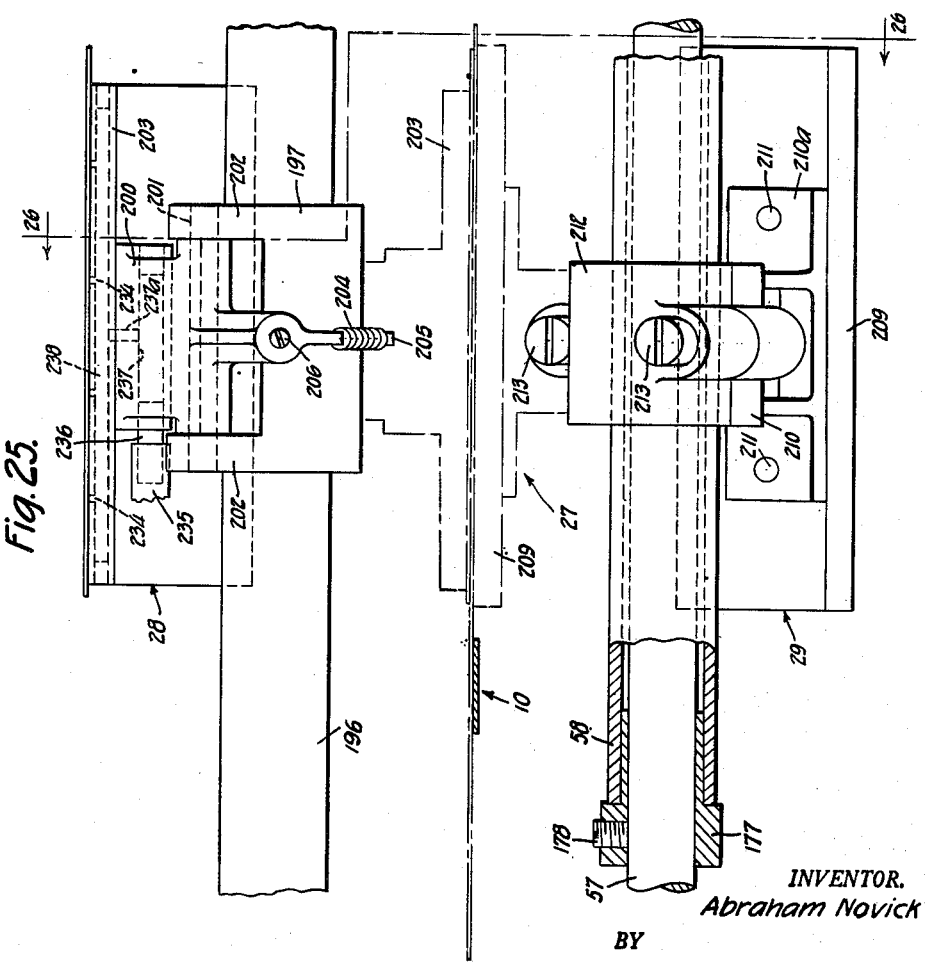

Feb. 10, 1953 A. NOVICK 2,627,792
ENVELOPE PATCH APPLYING MECHANISM
Filed Aug. 30, 1950 13 Sheets-Sheet 13

INVENTOR.
Abraham Novick
BY
Moses, Nolte, Crews + Berry
ATTONEYS

Patented Feb. 10, 1953

2,627,792

UNITED STATES PATENT OFFICE 2,627,792

ENVELOPE PATCH APPLYING MECHANISM

Abraham Novick, Flushing, N. Y., assignor to F. L. Smithe Machine Co., Inc., New York, N. Y., a corporation of New York Application August 30, 1950, Serial No. 182,385

12 Claims. (Cl. 93—61)

1

This invention relates to window envelope-making machinery, and more particularly to patch applying mechanism which is adapted to cut patches and apply them to successive envelope blanks as the blanks are advanced at uniform speed.

An important object of the invention is to provide for the application of patches in a machine of the plunger type as disclosed, for example, in Letters Patent of the United States #2,365,211, granted to me on December 19, 1944 for Envelope Machine.

In the machine of the patent, envelope blanks are fed in timed relation past sealing flap and bottom flap gumming mechanism and thence to an envelope forming plunger. In the machine chosen to illustrate the present invention the patch is applied after the blank has passed the gumming mechanism and before it has reached the plunger.

While the interposition of the patch applying mechanism necessarily involves an increased spacing of the plunger from the gumming mechanism and some extension of the blank path, it is important that the patch applier be provided in such a way as to require the minimum enlargement of the machine.

To this end, it is a feature of the invention that a patch mechanism is provided which feeds a patch web in from the side over the blank conveyor, above and across the path of blank travel for severance, and which then carries the severed patch in a plane at right angles to the direction of patch web advance for application to the blank. By this arrangement the patch mechanism can be made to occupy substantially no more space lengthwise of the blank conveyor than the width of the applying roller.

It is a further feature of the invention that the patch material is gummed before severance, and that the patch applier thereafter picks up and carries forward each severed patch by suction alone. To enable the patch to be picked up accurately and dependably it is an important point that the patch applier, in the form of a sector, is brought to rest instantaneously for picking up the patch but is caused to travel in contact with the blank at the uniform speed of the blank.

It is a further feature that means is provided for applying patch gum directly to the envelope blank along the blank margins bordering the ends of the window area, in combination with means for applying patch gum directly to the side margins of the patch web. In this way gum is provided for all four margins of the patch, the

2 stripes which extend in the direction of blank travel being impressed by rolling contact onto the blanks, and the stripes which run lengthwise of the patch web being impressed by rolling contact onto the web.

It is an object of the invention to provide mechanism for feeding out different predetermined appropriate lengths of patch web according to the work requirements, for severing each patch length fed out, and for applying the successive patches to the traveling blanks, all in timed relation to the feeding of the blanks.

It is still another object to provide a patch mechanism in which the patch material is fed out lengthwise of the patch to be severed and the severed patch is then advanced widthwise for application to the blank.

Other objects and advantages will hereinafter appear.

In the drawing forming part of this specification:

Figure 1 is a fragmentary view in elevation showing diagrammatically mechanism for feeding, gumming, severing and applying the window patches;

Figure 2 is a fragmentary plan view showing most of the parts illustrated in Figure 1;

Figure 3 is a fragmentary plan view of a patched envelope blank;

Figure 4 is a fragmentary view in elevation, partly in section, showing comprehensively the portion of the machine with which the invention is concerned;

Figure 5 is a fragmentary sectional view with some parts broken away, the section being taken upon the line 5—5 of Figure 18, looking in the direction of the arrows;

Figures 6 and 7 are fragmentary views which when laid end to end show partly in section and partly in elevation the actual construction of the patching, feeding, cutting and applying mechanism, the section being taken upon the line 6—6 of Figure 8 looking in the direction of the arrows;

Figure 8 is a fragmentary plan view showing substantially the mechanism of Figure 6;

Figure 9 is a vertical sectional view taken upon the section line 9—9 of Figure 14, looking in the direction of the arrows;

Figure 10 is a sectional view taken upon the line 10—10 of Figure 9, looking in the direction of the arrows;

Figure 11 is a sectional view taken upon the line 11—11 of Figure 9, looking in the direction of the arrows;

Figure 12 is a fragmentary sectional view taken upon the line 12—12 of Figure 9, looking in the direction of the arrows;

Figure 14 is a sectional view taken upon the staggered section line 14—14 of Figures 6 and 7 looking in the direction of the arrows;

Figures 15, 16 and 17 are detail views of three cams which are utilized in controlling the feeding of the patch strip and the cutting of individual patches from it;

Figure 19 is a fragmentary view in elevation showing details of the gripper and gripper control mechanism;

Figure 20 is a fragmentary sectional view taken upon the line 20—20 of Figure 19, looking in the direction of the arrows;

Figure 21 is a fragmentary sectional view taken upon the line 21—21 of Figure 19, looking in the direction of the arrows;

Figure 22 is a fragmentary view in elevation showing particularly the cutting knife and the clamp associated with the knife;

Figure 23 is a sectional view, partly broken away, the section being taken upon the line 23—23 of Figure 22, looking in the direction of the arrows;

Figure 24 is a fragmentary plan view showing the mechanism illustrated in Figure 22;

Fig. 25 is a fragmentary view showing in front elevation, but partly in section, a portion of the mechanism illustrated in Figure 7;

Figure 26 is a sectional view taken upon the staggered section line 26—26 of Figure 25 looking in the direction of the arrows;

Figure 6:
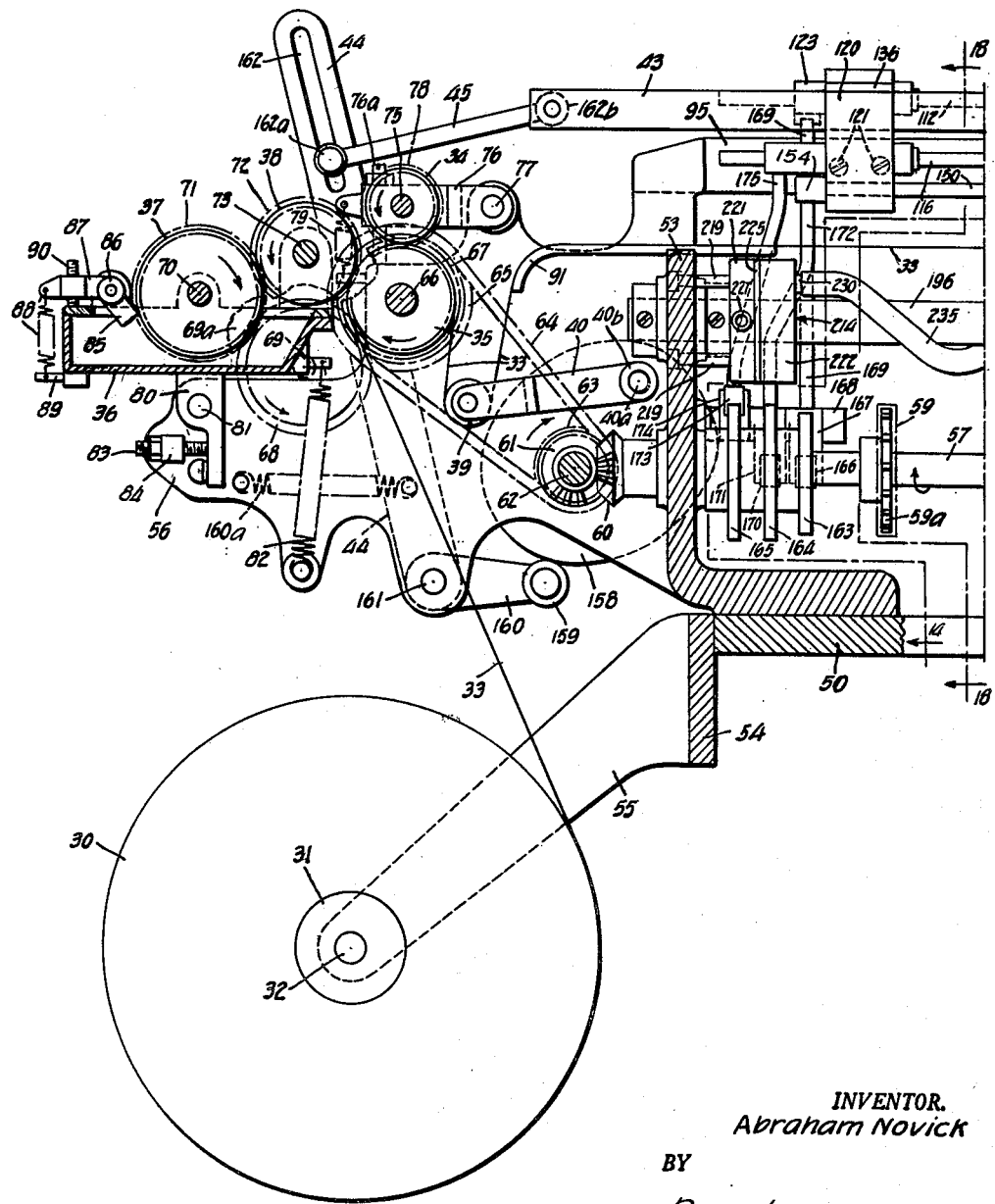

The machine of Patent #2,365,211 is generally illustrated in Figure 4 with the present patching mechanism added. The patching mechanism is diagrammatically illustrated in Figures 1 and 2. As an aid to a general understanding of the machine and the improvement, the mechanism will first be briefly described without attention to detail.

Window envelope blanks of the kind illustrated in Figures 2 and 3, but without patches, are fed from a stack 1 (Fig. 4) which is carried upon supports 2. The supports are inclined, to maintain the stack at a slight inclination to the horizontal. The blanks are removed singly from the lower end of the stack by separator mechanism 3 as referred to in Patent #2,365,211 and more fully described in Patent #2,241,474. The blanks are withdrawn from the stack at uniform time intervals and are transmitted in a generally downward direction by belt conveyor mechanism 4 which runs continuously. The blanks are delivered by the conveyor mechanism 4 to inert guide means designated generally by the reference numeral 5 which define an arcuate path for the blanks.

Rotary pusher means 6 are caused to traverse the arcuate path defined by the guide means 5 and to engage each envelope blank at the junction of the side flaps 7 with the sealing flap 8 of the blank, to push the blank forward in accurately timed and aligned relation to frictional conveyor mechanism 9 which defines a blank feeding path tangent to the arcuate path defined by the guide means 5. The conveyor 9 desirably comprises a pair of parallel belts 10, the upper stretches of which run over bars 10a. The belts act upon the side flaps 7 of the blanks and outside the bounds of the body portions of the blanks. Holddown rollers 11 opposed to the belts 10 cause the blanks to be advanced by the conveyor mechanism 9 past a gumming device which comprises a bed roller 13 and a pair of gumming segments 14 and 15.

The gumming segments 14 and 15 are mounted upon a common shaft 16, and hence the peripheries of the segments travel in a common circular path. One of the segments 14 is caused to apply the bottom flap gum 17 to a blank and the other segment 15 is caused to apply the seal flap gum 18 to a blank. These gums are of different character and hence provision is made for causing one kind of gum to be delivered to the segment 14 and another kind of gum to be delivered to the segment 15. Briefly, this is accomplished by providing gum supply means 19, including a transfer roller 20 to deliver gum to the segment 14 and gum supply means 21 including a transfer roller 22 for delivering gum to the segment 15.

Provision is made of mechanism (not shown) for oscillating the gum transfer rollers 20 and 22 in timed relation with the rotation of the gum segments 14 and 15, causing the transfer roller 22 to engage the segment 15 but to escape engagement with the segment 14 and causing the transfer roller 20 to engage the segment 14 but to escape engagement with the segment 15.

The conveyor mechanism 9 acts continuously and unidirectionally to carry the blanks frictionally past the gumming mechanism 12 and into position to be folded by plunger mechanism 24 which comprises a folding plunger 25 and a conventional folding box partially indicated at 26. The folding box is disposed between the belts 10 and beneath the plane of the upper or active stretches of the belts 10, and the plunger 25 reciprocates into and out of the folding box, delivering the partially folded blanks onto a conventional trap (not shown) for the completion of the folding operations. The present invention is not concerned with further details of the folding and drying of the envelopes, and hence such further folding means may be of any suitable and conventional construction, as disclosed, for example, in Letters Patent of the United States No. 1,631,146.

Between the gumming device 12 and the plunger 25 provision is made of patching mechanism 27.

The invention has to do with the patching mechanism per se and the combination of the patching mechanism with other parts of the machine. The patching mechanism has been largely omitted in Figure 4 in order to avoid confusion. Figure 4 does, however, illustrate a suction patch applier 28 and a cooperating bed roller 29. If the machine is viewed from the rear along the conveyor 9 as in Figs. 1 and 6, a supply reel 30 of patch material carried by a core or roller 31 upon a shaft 32 will be seen at the left of the conveyor, as illustrated in Figure 1. The patch strip or web 33 is drawn off the reel by feed rolls 34 and 35. A gum container 36 supplies gum through a pickup roller 37 to transfer discs 38. The discs 38 apply the gum to the longitudinal margins of the patch web 33, the discs 38 acting in opposition to the roller 35. Feed roller 34 also acts in opposition to the roller 35 but is sufficiently narrow and is so located as to escape engagement with the gum stripes. Slack take-up rollers 39 (Figs. 6 and 8) carried at the free end of a pivoted arm 40 ride the web 33 to prevent objectionable slack. The arm 40 is pivotally supported on a shaft 40a and is held in place axially of the shaft 40a by collars 40b.

The web 33 is drawn forward a patch length at a time by a reciprocating gripper 41 (Fig. 7) which is carried by an arm 42 fast on a reciprocating slide bar 43. The slide bar is reciprocated by an oscillating arm 44, being connected to the arm through a link 45. The gripper 41 is illustrated in Figure 1 as near its right hand limit of movement, the movable jaw 46 having been moved to its open position and a clamping finger 47 having been moved down against a stationary platform 48 to clamp the web 33 preparatory to the cutting of a patch by a knife 49.

With the parts in this condition the knife 49 descends to sever a patch length, and thereupon the patch is immediately seized by the suction roller 28 and carried forward in a plane at right angles to its previous advance for application to a blank. When the patch has been fully cut the knife returns to its normal or raised position.

When the patch has been moved out of the way of the gripper 41 moves leftward to seize the leading end of the web which is held between the finger 47 and the platform 48. As the gripper seizes the web, the clamping finger 47 is moved to a releasing position so that the web may again be drawn forward a patch length as the gripper moves toward the right. The cycle of operations described is repeated indefinitely in timed relation with the advancement of the blanks.

Since the blank feeding and gumming mechanisms and the plunger mechanism are all old no further and more detailed description and explanation of these parts is thought necessary. The patching mechanism will, however, be completely described and explained.

Figure 13:
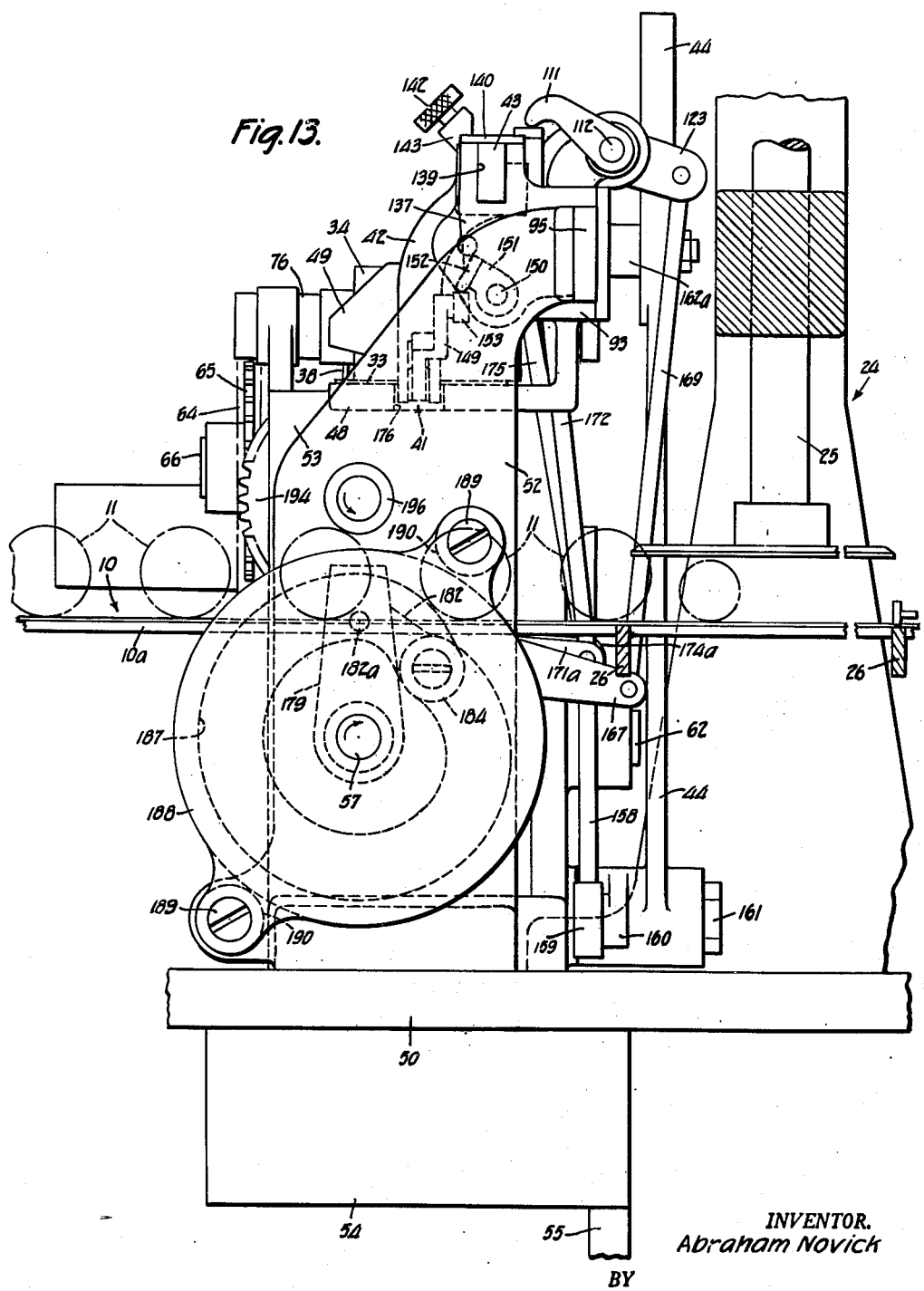
Figure 13 is a fragmentary elevation, partly in section, looking toward the right hand end of Fig. 7, showing particularly the patching mechanism and the plunger which immediately follows it.

A horizontal plate 50 (Figs. 6, 7 and 13) forms part of the machine frame and carries all the principal parts of the machine, and is in turn supported upon legs (not shown). The plate 50 supports longitudinally extending upright plates or brackets 52 and 53 which, in addition to other functions carry most of the patch applying mechanism.

A bracket 54 is attached to the plate 50 and includes a downwardly extending arm 55 on which the reel supporting shaft 32 is mounted. Transversely extending upright plates 56 and 56a (Fig. 8) form parts of the bracket 53. The plate 56 serves to support the gum receptacles, the feeding and gumming rollers associated therewith and certain gearing and other members which form parts of the patching mechanism. The plate 56a assists in supporting the feed roller 35.

A shaft 57, revolubly mounted at one end in the frame member 53, and revolubly mounted at the opposite end through the medium of a hollow shaft 58 in the frame member 52, is driven through a chain 59 and a sprocket 59a, and serves in turn to drive the feeding and gumming rollers of the web 33.

The shaft 57 has fast on one of its ends a beveled gear 60 which, through a meshing beveled gear 61 drives a shaft 62. The shaft 62 has fast upon it a sprocket 63. A chain 64 transmits the drive from the sprocket 63 to a sprocket 65 which is fast upon a shaft 66. The feed roller 35 around which the web 33 runs is also made fast upon the shaft 66. The shaft 66 has secured upon it a gear 67 which drives a gear 68 rotatable upon a shaft 69 secured to the plate 56 (Figs. 6 and 8). The gear 68, in turn, drives a gear 69a fast on a shaft 70. The gum pick-up roll 37 is fixed on the shaft 70, and is arranged to deliver gum from the receptacle 36 to the rollers 38. The shaft 70 also has fast upon it a gear 71 which drives a gear 72 fast on a shaft 73. The shaft 73 also has fast upon it the gumming discs or rollers 38, whereby gum is applied to the opposite side margins of the web.

A shaft 75 is carried by rocking arms 76, one at each end. The arms are mounted on shafts 77. One of these shafts 77 is supported in the plate 56, and the other is supported in the plate 56a (Fig. 8). The shaft 75 has fast upon it a gear 78 and the feed roller 34. The gear 78 meshes with the gears 67. The arms 76 are each drawn down by a tension coil spring 79 to maintain the gear 78 in mesh with the gear 67 and the roller 34 in bearing relation to the roller 35. Adjustable stop screws 76a are carried one on each arm 76 to limit the movement of the roller 34 toward the roller 35 so as to avoid undue pressure on the strip 33. The arms 76 can, however, be swung upward when desired to separate the rollers and thereby facilitate the threading through of a fresh web 33.

The gum receptacle 36 is made fast upon a supporting arm 80, which arm is rockably supported upon a shaft 81, fast on plate 56. A tension coil spring 82 urges the gum receptacle in a clockwise direction and causes a tail portion of the arm 80 normally to bear against a stop screw 83. The rollers 37 and 38 and their supporting shafts 70 and 69 are carried by the gum receptacle. Rocking of the receptacle in a counter-clockwise direction against the force of the spring 82 carries the rollers 38 out of bearing relation to the roller 35, without disturbing the gear connections to the roller 38. The stop screw 83 is threaded through a stationary block 84 on the plate 56 and may be adjusted to secure the desired normal relation of the rollers 38 and 35.

A scraper blade 85 is provided for controlling the thickness of the film of gum carried by the roller 37 to the rollers 38. The scraper blade is made fast upon a shaft 86, which also has fast upon it an arm 87. A tension coil spring 88 connected between the arm 87 and a pin 89 fast upon the gum receptacle 36, urges the scraper blade 85 in a counter-clockwise direction. Counter-clockwise movement of the scraper blade 85 is limited, however, by a stop screw 90 which is threaded through the arm 87 and normally bears against an upper surface of the gum receptacle 36.

The web 33, after passing around the roller 35, is passed beneath the web riding rollers 39 which are carried by the rocker arm 40 and thence upward along a stationary guide 91 supported on the bracket 53. The leading end of the web extends onto the platform 48 and, with the parts in the positions illustrated in Fig. 7, is clamped down against the platform by the clamp finger 47.

The clamp finger 47 is mounted upon a shaft 92 which is carried by a block 93. A further arm 94 fast upon the finger 47 is caused by cam mechanism to operate the clamp finger 47. The platform 48 is desirably formed as an integral extension of the block 93.

The block 93 is formed with a channel 95a (Fig. 23) in its rear face which fits upon a rigid supporting bar 95. A plate 96 is secured to the block by screws 97 and extends across the channel so that a closed guideway is formed in which the bar 95 is received. A set screw 98, threaded through the plate 96, may be tightened against the bar 95 to secure the block 93 and the mechanism carried by it in desired adjusted position. The block 93 has a bracket 99a secured to its face by screws 99b. The bracket 99a includes an extension 99, upon which the shaft 92 for the clamping finger 47 is fixed. The finger 47 is held in place against a shoulder by means of a head 101 on the stub shaft 92. A spring 100 normally holds the clamping finger 47 against the web 33 on the platform 48.

The block 93 has formed in its forward face a vertically extending channel 102 (Figs. 22, 23 and 24) in which a knife carrying plunger 103 is slidably mounted. Retaining blocks 104 and 105 overlap the outer sides of the channel 102 and are held in place by screws 106. A compression coil spring 107 is interposed between the plunger 103 and the platform 48 for urging the plunger upward. The plunger includes an extension 108 to which the knife blade 49 is secured by countersunk rivets 109.

The knife blade 49 is shaped as illustrated in Fig. 23 with the edge sloping upward symmetrically from a center point. With this arrangement the web is cut progressively from the center outward in both directions as the blade descends, the extreme margins of the web being cut through last and substantially at the same instant.

The upper end of the plunger 103 is arranged to be engaged and thrust downward by a crank arm 111 which is made fast upon a shaft 112. The shaft 112 is rotatively mounted in an ear 113 of the block 93. The shaft 112 is secured against longitudinal movement relative to the block, the hub of arm 111 being made fast upon the shaft upon one side of the ear 113 and a collar 114 being made fast upon the shaft at the opposite side of the ear 113.

The operating arm 94 of the clamping finger 47 is arranged to be engaged and thrust downward, in order to lift the finger away from the platform 48, by a crank 115 (Figs. 7, 14, 22, 23 and 24) which is fast upon a rock shaft 116. The rock shaft 116 is pivotally supported in a bearing 117 of the extension 99, and is held against longitudinal movement relative to the bearing by collars 118 and 119 which are made fast to the shaft at opposite sides of the bearing.

Figure 18:
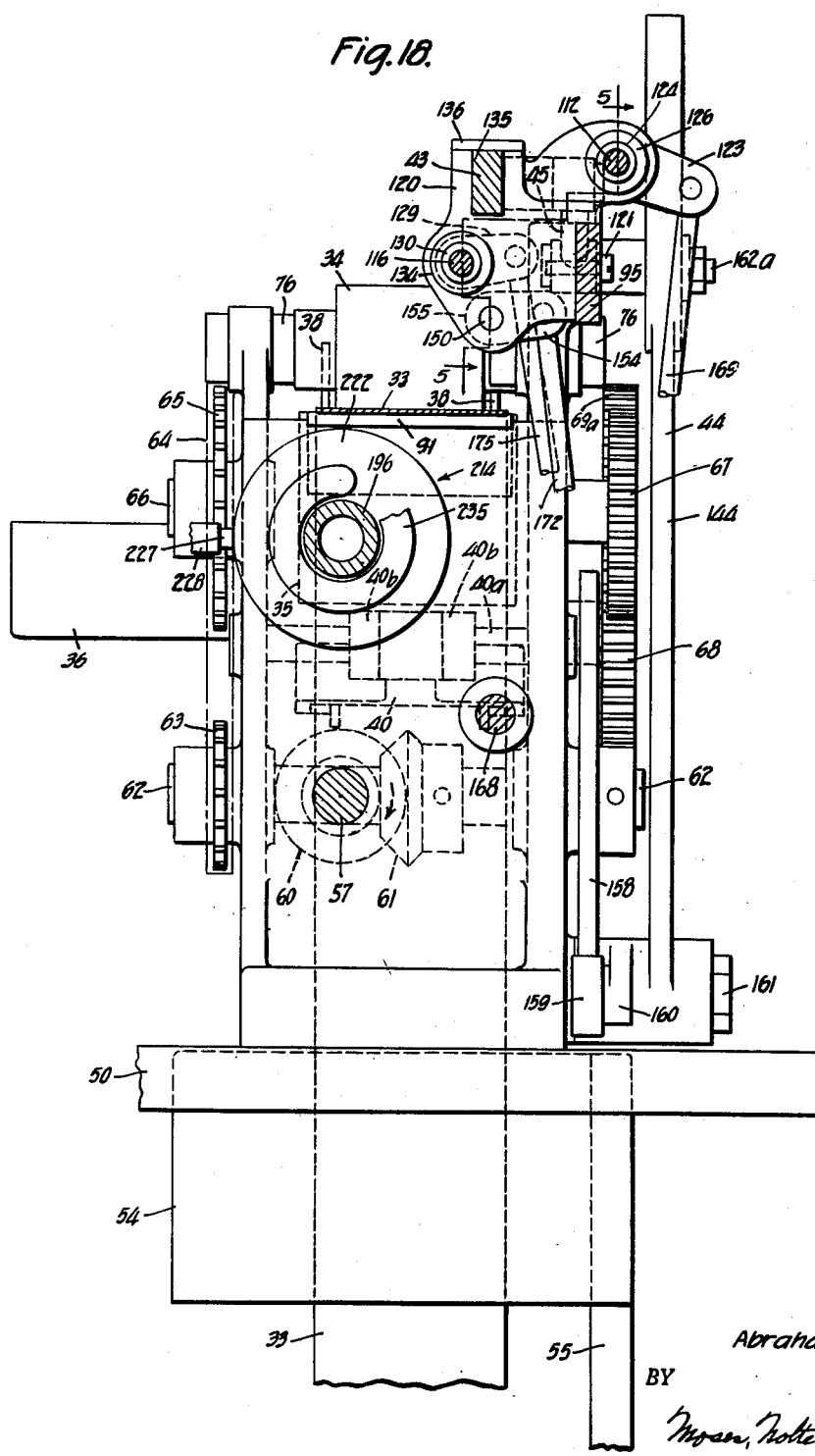
Figure 18 is a fragmentary view in sectional elevation, the section being taken upon the line 18—18 of Figure 6, looking in the direction of the arrows.
Figure 28:
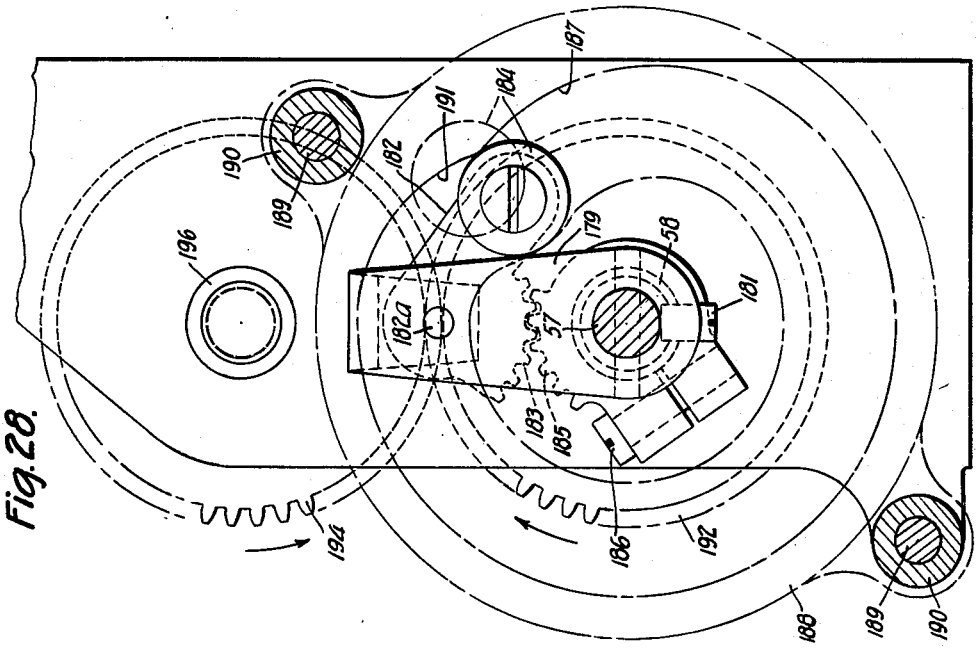
Figure 28 is a sectional view taken upon the line 28—28 of Figure 27, looking in the direction of the arrows.
Figure 27:
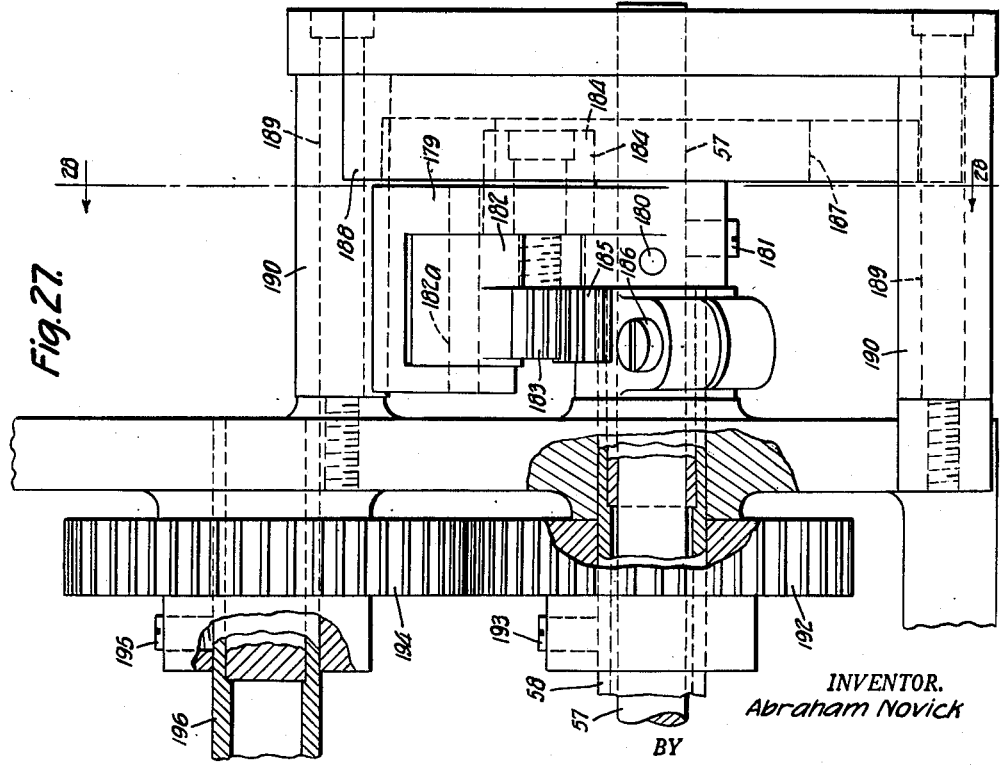
Figure 27 is a fragmentary view in elevation, partly broken away, showing a portion of the mechanism illustrated in Figure 7.

The opposite ends of shafts 112 and 116 are rockably supported in a block 120 (Figs. 5, 6 and 18) which is secured upon the bar 95 near the left hand end thereof as the parts are viewed in Figs. 6 and 7. The block 120 is secured to the bar 95 by screws 121 which are passed through the bar and threaded into the block. An actuating arm 123 for rocking the shaft 112 is formed as an integral extension of a sleeve 124. The sleeve and the shaft are formed with keyways for receiving a key 125 through which rocking movement of the arm 123 is transmitted to the shaft.

The hub portion of the arm 123 forms a shouldered enlargement of the sleeve which bears against one side of the block 120. The sleeve extends through the block 120 and projects beyond the block at its smaller end. A collar 126 is secured upon the sleeve by means of a screw 127 whose body extends through the sleeve and into the key 125 but terminates short of engagement with the shaft 112. A screw 128 is threaded through the hub portion of the arm 123 and passes into the key 125 but terminates short of engagement with the shaft 112. With the arrangement referred to the sleeve 124 is secured against axial movement relative to the block 120 but is free to rock and to impart rocking movement to the shaft 112. The shaft 112 can, however, be adjusted axially with the block 93 and relative to the block 120.

The shaft 116 is similarly supported in the block 120 and is similarly connected for actuation by a crank arm 129 which is formed integral with a sleeve 130. The sleeve 130 and shaft 116 are formed with keyways in which a key 131 is received for transmitting rocking movement of the sleeve to the shaft. A screw 132 is threaded through the hub portion of the arm 129 and extends into the key, but terminates short of engagement with the shaft 116. A screw 133 is threaded through a collar 134 at the opposite side of the block 120 and passes through the sleeve and into the key, but terminates short of engagement with the shaft.

The block 120 is formed with a guide channel 135 (Fig. 18) in which the rod 43 is slidably mounted. The rod is confined in the channel by a cover plate 136 secured to the bracket 120. A further block 137 (Figs. 7 and 13) is made fast upon the supporting bar 95 by screws 138. The block 137 is also formed with a guide channel 139 for the rod 43, the channel being covered on its open side by a fixed plate 140.

The gripper carrier 42 (Figs. 7, 13, 19 and 20) is formed with an upwardly facing channel 141 which fits upon the rod 43. A screw 142 is screwed through a bored and threaded extension 143 of the gripper carrier 42 into engagement with an upper beveled surface of the rod 43 to clamp the gripper carrier securely in adjusted position on the rod. The gripper carrier 42 extends downward and has its lower end offset to the left to provide the lower or fixed gripper jaw 144. Near the lower end the carrier is divided to provide spaced side portions 145 and 146 in which a pivot pin 147 is mounted for supporting the movable jaws 46.

A tension coil spring 148 connected to the carrier 42 and to a tail portion 149 of the movable jaw 46 tends to maintain the movable jaw 46 in its closed position. A rock shaft 150 which is rockably mounted in the blocks 120 and 137 (see Figs. 6 and 7), has fast upon it an arm 151 upon which is fixed a bar 152 that extends parallel to the direction of movement of the rod 43. The bar 152 is engageable with a roller 153 which is carried by the tail 149, throughout the entire operative range of movement of the roller. An actuating rocker arm 154 (Figs. 5, 6 and 18) includes a hub portion 155 which is secured upon the shaft 150 by a pin 156 and which engages the left hand side of the block 120. When the shaft 150 is rocked in a direction to depress the bar 152, the movable gripper jaw 46 is held open, but when the bar is raised to a position like that illustrated in Fig. 19 the movable gripper jaw is permitted to close.

The shaft 150 extends through the knife-carrying extension 108 of the plunger 103. The extension 108 is accordingly provided with a vertically extending slot 157 (Fig. 23) so that the extension 108 can reciprocate vertically to actuate the knife without encountering interference by the shaft.

The mechanism for actuating the reciprocating pull-out rod 43 comprises a cam 158 (Figs. 6, 8 and 18) which is fast upon shaft 62. The cam 158 engages a follower roller 159 carried by a crank 160 which is pivotally mounted upon a pivot stud 161 on the plate 56. The crank is integral with the arm 44 to which is connected a return spring 160a. Consequently, the arm 44 through which reciprocation is imparted to the pull-out rod 43 is actuated in one direction by the cam 158 and is returned by the spring 160a. The link 45 is connected to the arm 44 through a pivot block 162a, and to the rod 43 by a block 162b. The pivot block 162a is adapted to be clamped in any desired position along a slot 162 formed in the arm 44, and to provide a pivot for one end of the link 45.

Adjustment of the pivot block 162a along the arm 44 changes the extent of movement of the rod 43 but does not change the timing of the rod relative to the other parts. That is to say, the rod 43 reaches its left hand and right hand limits of movement at the same points in the rotation of the shafts 57 and 62 regardless of the adjustment selected. Adjustment of the pivot block 162a is, however, likely to affect the position of the left hand limit of movement of the gripper in an undesired manner. This can be compensated for by backing out the screw 142 (see Figure 20), shifting the gripper carrier 42 relative to the rod 43, and again tightening the screw 142. Adjustment is effected by adjusting the pivot block 162a in accordance with the length of patch desired, and by thereafter adjusting the gripper carrier to secure the left hand limit of movement desired.

The shaft 57 has fast upon it three cams 163, 164 and 165, Figs. 6, 14, 15, 16 and 17. The cam 163 actuates the rock shaft 112 through which the knife is controlled. The cam 164 actuates the rock shaft 150 through which the movable gripper jaw is controlled. The cam 165 actuates the rock shaft 116 through which the clamp finger 47 is controlled.

The cam 163 acts upon a follower roller 166 which is carried by a bell crank 167, rockably mounted upon a shaft 168 secured to the frame plate 53. The other arm of bell crank 167 is pivotally connected through a link 169 to the actuating arm 123 of the shaft 112.

The cam 164 acts upon a follower roller 170 carried by a bell crank 171 which is also rockably mounted upon the shaft 168. The other arm 171a of the bell crank 171 is connected through a link 172 with the actuating arm 154 of the shaft 150.

The cam 165 acts upon a follower roller 173 carried by a bell crank 174 which is also rockably mounted upon the shaft 168. The other arm 174a of the bell crank 174 is connected through a link 175 with the actuating arm 129 of the shaft 116.

The contours of the cams 163, 164 and 165 are illustrated in Figures 17, 16 and 15, respectively. These figures also show the relative angular positions of the cams upon the shaft 57 and the relations of the cams to their followers. Each of the cams is made in two sections, the sections being clamped together upon the shaft by screws, as indicated.

The cycle of operations of the cam controlled parts may advantageously be recapitulated at this point. With the parts as illustrated in Figures 6, 7 and 14, the movable gripper jaw 46 has just closed on the web, the clamping finger 47 is just ready to be released, and the gripper carrier 42 is in its extreme left hand position. As the gripper travels toward the right in Fig. 7, it pulls the web with it until it reaches its right hand limit of movement. As it does so, the clamping finger 47 becomes effective and the knife starts cutting through the web. As the cut is completed the movable gripper jaw 46 is moved to open position by the descent of the bar 152. At this instant, the severed patch is picked up by the patch applier 28. The gripper carrier then starts its return movement toward the left, the movable jaw 46 being kept open until the carrier 42 has reached its left hand limit of movement. At that point the bar 152 is lifted to cause the movable jaw to close upon the web, and the clamp finger 47 is raised in order to permit the web to be pulled forward again by the gripper. The point should be noted that the platform 48 is formed with a notch 176 (see Figures 7, 20 and 24) which may be entered by the fixed gripper jaw.

It has been mentioned that the suction patch applier 28 comes to rest for an instant just as it takes over control of the severed patch. The mechanism for producing this result is best shown in Figures 7, 13, 25, 27 and 28. The constantly running shaft 57 extends through the hollow shaft 58 which shaft is rotatably supported in the frame member 52. A collar 177 made fast upon the shaft 57 by a set screw 178 prevents movement of the hollow shaft 58 toward the left. Just beyond the opposite end of the hollow shaft 58 an arm 179 is secured upon the shaft 57 by means of a pin 180 and a set screw 181. The hub of the arm 179 prevents movement of the hollow shaft 58 toward the right.

It also constitutes an element through which the shaft 58 is driven at variable speed from the constant speed shaft 57. The arm 179 has rockingly mounted upon it by a pin 182a a bell crank lever 182. One arm of the lever is formed as a gear segment 183 while the other arm carries a cam follower 184. The gear segment 183 meshes with a gear segment 185 whose hub is formed as a split collar and clamped upon the hollow shaft 54 by means of a screw 186. The cam follower 184 rides in a cam track 187 of a stationary cam 188. The cam 188 is mounted on the frame member 52, being attached by screws 189, each of which is surrounded by a spacing sleeve 190.

The major portion of the cam track is concentric with the shafts 57 and 58. So long as the follower 184 is traveling in a concentric portion of the track, the bell crank 182 cannot rock about its own pivot 182a and hence serves to transmit drive positively and without variations through the gear segment 185 to the hollow shaft 58. For a short distance in the portion of the cam track marked 191 the track approaches the center in the direction of shaft rotation (which is clockwise as the parts are viewed in Figure 28) and this causes the segment 185 to be rocked counter-clockwise relative to the arm 179. This portion of the track is so contrived that the segment 185 and the hollow shaft 58 upon which it is made fast come to a standstill for just an instant and then pick up speed again. At the point of operation illustrated in Figure 28, the hollow shaft 78 has paused and has been again accelerated to the speed of the shaft 57. As the effective radius of the cam track increases in the ensuing operation, the hollow shaft 58 is caused to run above normal speed until the follower has again entered the concentric portion of the track.

The bed segment 29 which cooperates with the patch applier 28 is made fast upon the hollow shaft 58 and hence participates in the variations of speed which have been described. The shaft 58 has a gear 192 secured to it by means of a set screw 193. The gear 192 drives an equal gear 194 which is secured by the set screw 195 to a shaft 196. The shaft 196 has fast upon it the patch applier 28.

The details of construction of the bed segment 29 and the patch applier 28 are best illustrated in Figures 25 and 26. A collar 197 is fixed to the shaft 196 by means of a key 198 and a set screw 199. A lever 200 is supported upon a pivot pin 201 which is carried in ears 202 of the collar 197. The patch carrying segment 203 is made fast upon one end of the lever 200. The opposite end of the lever is connected by a tension coil spring 204 to a pin 205 which is secured to the collar 197. The spring tends to swing the lever 200 in a counter-clockwise direction (as viewed in Figure 26) and hence to carry the segment 203 upward. Such swinging movement is limited, however, by a stop screw 206 which is threaded through the tail of the lever 200 and bears against the collar 197. The normal position of the segment 203 is determined by the adjustment of the screw 206.

The securement of the segment 203 upon the lever 200 is effected by screws 207. A bar 208 is fitted into opposed channels of the lever and the segment, and the bodies of the screws 207 are passed through the segment and the bar and threaded into the lever.

The bed segment 29 comprises a work engaging segment 209 which is attached to a segmental portion 210a of hub member 210 by screws 211. The hub member 210 and a complementary hub member 212 are formed to embrace the shaft 58 and are clamped to it by means of screws 213.

As has been mentioned, the segment 203 picks up the patch by suction. It is illustrated in the act of picking up a patch in Figs. 25 and 26. The supply of suction to the segment 203 is controlled through valve mechanism 214 which is best illustrated in Figures 6 and 9 to 12, inclusive, and 14. This mechanism is mounted upon the shaft 196 and adjacent to the frame member 53.

The shaft 196 is revolubly supported in the frame member 53 between collars 215 and 216 which are secured to the shaft, respectively, by set screws 217 and 218. A series of screws 219 surround the collar 216 and support a stationary valve member 221 at a fixed distance from the frame member 53, holding it against rotation with the shaft 196. A rotary valve member 222 is connected to the shaft by set screws 223 and 224. A washer 225 is interposed between the members 221 and 222.

The stationary member 221 is formed in its right hand face (Fig. 9) with an arcuate groove 226, see Fig. 10 also, which is entered by a nipple 227. A suction hose 228 is connected to the external portion of the nipple 227. The rotary valve member 222 is formed with a circular opening 229 into which a nipple 230 is threaded. The diameter of the opening 229 is substantially the same as the width of the groove 226 and the opening is located at the same distance from the center as the groove so that the opening travels in communication with the groove throughout a substantial portion of its travel. The washer 225 has an opening 231 in register with the opening 229 of the valve member 222.

The washer fits upon the shaft 196 and is maintained in fixed relation to the valve member 222 by a pin 232 of the valve member which fits into a jig hole 233 of the washer.

The timing of the parts is such that suction is admitted to the opening 230 just as the segment 203 arrives in position to pick up a patch as illustrated in Figure 26 while the suction is cut off just as the suction ports 234 of the segment 203 come opposite the segment 209.

A flexible hose 235 is fitted onto the external portion of the nipple 230. The hose is wrapped around the shaft 196 for convenience of support and is fitted onto a nipple 236 (Fig. 25) of the lever 200. The nipple 236 communicates through a passage 237 with a bore 238 of the segment 203. A series of suction ports 234 extends from the bore 238 through the face of the segment 203 near the leading end thereof.

The transference of the patch from the cut position onto the blank exclusively by suction is advantageous because it enables the patch to be cleanly handled, notwithstanding the fact that the side margins of the patch are continuously gummed from end to end. The gum applied to the side margins of the patch can be exclusively relied upon if desired for securing the patch to an envelope blank.

More desirably, however, the end margins of the patch should also be adhered to the blank. For this purpose the gum segment 14 (Fig. 4) through which the bottom flap gum is applied to the blank is desirably modified as compared with the prior construction to include a pair of circumferentially extending ribs for picking up gum from the roller 20 and applying it along the blank margins which border the ends of the window opening. The gum transfer ribs referred to are made short enough in extent to avoid extending the gum stripes beyond the area which will be covered by the patch.

When the gum segment 14 is thus extended the control of the oscillation of rollers 20 and 22 is modified so as to assure contact of the segment 14 with the roller 20 throughout the desired period and withdrawal of the roller 22 from position to engage the segment 14 for at least the extended period during which the segment travels across the face of the roller 22.

When the pivot block 162a is adjusted along the slot 162 of the arm 44 to increase or diminish the throw of the rod 43 the consumption of patch material is correspondingly increased or diminished. It is necessary then to adjust the constant rate of feed of the web 33 from the reel 30 by the feed rollers and to adjust the rate of rotation of the gum pick-up roller 69 and the gum transfer rollers 68. For this purpose the sprockets 63 and 65 are made readily replaceable upon the shafts 62 and 66, and other sprockets are provided for substitution in the machine so that an appropriate rate of feeding can be obtained for each length of patch desired.

I have described what I believe to be the best embodiments of my invention. I do not wish, however, to be confined to the embodiments shown, but what I desire to cover by Letters Patent is set forth in the appended claims.

What is claimed is:

1. Apparatus for applying patches to window openings of envelopes, comprising a feed mechanism for feeding a continuous strip of material along a path in one plane for severance, means operating in timed relation with said feeding mechanism for severing the strip into individual patches of a size to cover a window opening, and rotary patch applying mechanism for receiving and applying the individual patches to the envelopes over the window openings, said rotary mechanism disposed to turn about an axis parallel to the direction of strip feeding and delivering the individual patches to the envelopes in a plane parallel to the plane of strip feeding and in a direction at right angles to the direction of strip feeding.

2. Apparatus for the continuous application of individual slips to successive moving envelope blanks as said blanks are conveyed through an envelope-making machine, comprising feed mechanism for feeding a continuous strip of material along a path in one plane for cutting, cutting mechanism for cutting successive slip lengths from the strip, and rotary mechanism rotative about an axis parallel to the direction of strip feeding and operable to withdraw the individual slips sidewise one by one, to convey them to the envelope-making machine and to roll the slips one by one onto the successive envelope blanks.

3. A window envelope making machine comprising, in combination, means for advancing window envelope blanks singly and at uniform speed, lining face up, in definitely timed and aligned relation, and mechanism for supplying patches to the blanks comprising means for feeding a strip of patch material laterally of the path of blank travel, cutting mechanism acting in timed relation with the blank feeding for cutting successive patches from the end of the strip with one dimension of the patch derived from the length of the strip, and a rotary patch carrier also acting in timed relation with the blank feeding for picking up each patch as it is cut and rolling it in the direction of its other dimension onto the upper face of a traveling blank.

4. A patch applier comprising in combination, a strip feeder for feeding a strip of patch material in a prescribed path, cutting mechanism acting in timed relation with the feeder for cutting successive patches from the leading end of the strip, a rotary patch carrier mounted for operation about an axis parallel to the prescribed path of strip feeding, and means operating the carrier in timed relation with the feeder for picking up each patch as it is cut and conveying it to a patch applying station.

5. Apparatus for applying patches to envelopes, comprising feed mechanism for feeding a continuous strip of material in one direction for severance, means operating in timed relation with said feeding mechanism for severing individual patches from the leading end of the strip one after another, and rotary mechanism for receiving the undivided patches and applying them to the envelopes, said rotary mechanism turning about an axis that extends parallel to the direction of travel of the patch strip and delivering the individual patches to the envelopes in a direction at right angles to said direction of travel of the patch strip.

6. Apparatus for applying patches to envelopes comprising feed mechanism for unreeling and advancing a continuous strip of patch material to form a slack loop, cutting mechanism beyond the slack loop for cutting patches of predetermined length from the strip, a reciprocating gripper for drawing successive patch lengths out beyond the cutting mechanism for severance, a clamp associated with the cutting mechanism for holding a strip during severance and thereafter until the gripper returns and seizes the freshly cut end of the strip, and a rotary patch applier for taking over control of each patch as it is cut for rolling it onto the blank.

7. Apparatus for applying patches to envelopes comprising feed mechanism for unreeling and advancing a continuous strip of patch material to form a slack loop, cutting mechanism beyond the slack loop for cutting patches of predetermined length from the strip, a reciprocating gripper for drawing successive patch lengths out beyond the cutting mechanism for severance, a clamp associated with the cutting mechanism for holding a strip during severance and thereafter until the gripper returns and seizes the freshly cut end of the strip, a rotary patch applier for taking over control of each patch as it is cut for rolling it onto the blank, and means for adjusting the range of movement of the gripper to change the length of strip fed out and severed in each cycle of operation.

8. Apparatus for applying patches to envelopes comprising feed mechanism for unreeling and advancing a continuous strip of patch material to form a slack loop, cutting mechanism beyond the slack loop for cutting patches of predetermined length from the strip, a reciprocating gripper for drawing successive patch lengths out beyond the cutting mechanism for severance, a clamp associated with the cutting mechanism for holding a strip during severance and thereafter until the gripper returns and seizes the freshly cut end of the strip, a rotary patch applier for taking over control of each patch as it is cut for rolling it onto a blank, and means for adjusting the range and rate of movement of the gripper while maintaining the relative timing of the parts unaltered, to change the length of strip fed out and severed in each cycle of operation.

9. Apparatus for applying patches to envelopes comprising feed mechanism for unreeling a continuous strip of patch material and advancing it along a prescribed path, means for gumming the opposite longitudinal margins of the strip continuously as it is advanced lengthwise, means for severing patches of predetermined length from the gummed strip, and a rotary suction patch applier, having its axis disposed parallel to said path, and acting exclusively by suction to take over control of each patch as it is severed and roll it sidewise onto a blank.

10. In a window envelope machine of the plunger type, in combination, a bottom and sealing flap gummer, a forming plunger, blank feeding mechanism comprising a conveyor for feeding the blanks past the gummer and to the plunger in definitely timed relation, and means for applying window patches to the blanks between the gummer and the plunger comprising means for feeding a strip of patch material from one side of the conveyor above and in a direction crosswise of the path of blank travel, means for severing successive patches from the leading end of the strip, and a rotary patch applier operating about an axis parallel to the direction of strip feeding for taking over control of each patch as it is severed and rolling it sidewise onto a blank.

11. In a patch mechanism, the combination with means for feeding successive lengths of a strip of patch material, of a patch severing cutter comprising a blade having two cutting edges in a common plane which form an obtuse angle with one another intermediate the length of the blade, and a rotary patch applier having its axis parallel to the direction of strip feeding for taking over control of each patch as it is severed, moving it at right angles to the direction of strip feeding, and rolling it onto a blank.

12. In a window envelope machine, in combination, means for advancing window blanks continuously along a definite path and in definitely timed relation, and patch applying mechanism comprising means for feeding a strip of patch material crosswise of the path of blank travel, means for severing successive patches of predetermined length from the leading end of the web, a rotary suction patch applier having its axis parallel to the direction of strip feeding and operable to take over control of each severed patch and roll it sidewise onto a blank, and operating mechanism for the applier comprising cam and gear means for causing the applier to travel at a peripheral speed equal to the speed of blank travel while pressing the patch against a blank, but to stop for an instant as it takes control of each patch.

ABRAHAM NOVICK.

REFERENCES CITED

The following references are of record in the file of this patent:

UNITED STATES PATENTS

| Number | Name | Date |
|---|---|---|
| 1,227,017 | Swift | May 22, 1917 |
| 1,313,248 | Ball | Aug. 19, 1919 |
| 1,337,735 | Swift | Apr. 20, 1920 |
| 2,006,215 | Kassert | June 25, 1935 |